(12) United States Patent
Jung et al.

(10) Patent No.: US 12,485,463 B2
(45) Date of Patent: Dec. 2, 2025

(54) PIPE PIGGING SYSTEM FOR CLEANING AND CONTROLLING SPEED OF PIG

(71) Applicant: TECHWIN CO., LTD., Chungcheongbuk-do (KR)

(72) Inventors: Boong Ik Jung, Gyeongsangbuk-do (KR); Jung Sik Kim, Sejong-si (KR); Kwang Su Song, Chungcheongbuk-do (KR); Min Yong Kim, Chungcheongbukdo (KR); Eui Jip Choi, Chungcheongbuk-do (KR)

(73) Assignee: TECHWIN CO., LTD., Chungcheongbuk-do (KR)

( * ) Notice: Subject to any disclaimer, the term of this patent is extended or adjusted under 35 U.S.C. 154(b) by 330 days.

(21) Appl. No.: 18/039,962

(22) PCT Filed: Oct. 19, 2021

(86) PCT No.: PCT/KR2021/014532
§ 371 (c)(1),
(2) Date: Jun. 1, 2023

(87) PCT Pub. No.: WO2022/119113
PCT Pub. Date: Jun. 9, 2022

(65) Prior Publication Data
US 2024/0001413 A1      Jan. 4, 2024

(30) Foreign Application Priority Data

Dec. 1, 2020    (KR) .......................... 10-2020-0165821

(51) Int. Cl.
   *B08B 9/055*    (2006.01)
   *B08B 3/04*    (2006.01)
   *F16L 55/26*    (2006.01)

(52) U.S. Cl.
   CPC .............. *B08B 9/0551* (2013.01); *B08B 3/04* (2013.01); *B08B 9/0557* (2013.01); *F16L 55/26* (2013.01); *B08B 2209/0553* (2013.01)

(58) Field of Classification Search
   CPC .................................. F16L 55/46; F16L 55/48
   See application file for complete search history.

(56) References Cited

U.S. PATENT DOCUMENTS

| 5,891,260 A | * | 4/1999 | Streets | .................... | F16L 55/46 |
| | | | | | 15/104.062 |
| 9,651,190 B1 | | 5/2017 | Hailey | | |

(Continued)

FOREIGN PATENT DOCUMENTS

| GB | 2 195 740 | 4/1988 |
| JP | 11148600 A | 6/1999 |

(Continued)

*Primary Examiner* — Eric J Rosen
(74) *Attorney, Agent, or Firm* — Panitch Schwarze Belisario & Nadel LLP

(57) ABSTRACT

Disclosed is a pipe pigging system for cleaning a pig and controlling a speed of the pig, the pipe pigging system including a pig configured to clean an inside of a pipe for raw material supply while moving in the pipe, a first station connected to a raw material supply side that is one end of the pipe and configured to launch the pig and receive the returned pig, a second station connected to a raw material reception side that is the other end of the pipe and configured to receive the pig launched from the first station and launch the pig toward the first station, a first compressed air supply unit and a second compressed air supply unit configured supply compressed air to the first station and the second station, respectively, to move the pig, a first pig cleaning unit and a second pig cleaning unit connected to the first station and the second station, respectively, to clean the pig contaminated after cleaning the pipe, and a control unit configured to control a pigging operation of the pig launched and (Continued)

returned between the first station and the second station and a pigging speed of the pig.

7 Claims, 3 Drawing Sheets

(56) References Cited

U.S. PATENT DOCUMENTS

| | | | |
|---|---|---|---|
| 2016/0010784 A1* | 1/2016 | Hofer | F16L 55/46 15/104.062 |
| 2016/0258568 A1* | 9/2016 | Mayorov | H04W 4/80 |
| 2022/0003629 A1* | 1/2022 | Jagannathan | F17D 5/06 |

FOREIGN PATENT DOCUMENTS

| | | |
|---|---|---|
| JP | 2008238119 A | 10/2008 |
| KR | 101037472 B1 | 5/2011 |
| KR | 101193306 B1 | 10/2012 |
| KR | 10201500220790 A | 2/2015 |
| WO | WO 98/34060 | 8/1998 |
| WO | WO-2009067769 A1 * | 6/2009 ............... F17D 3/08 |

* cited by examiner

PIPE PIGGING SYSTEM FOR CLEANING AND CONTROLLING SPEED OF PIG

TECHNICAL FIELD

The present invention relates to a pipe pigging system, and more specifically, to a pipe pigging system for cleaning a pig and controlling a speed of the pig, wherein the pipe pigging system may remove residue remaining in a transfer line of a raw material supply apparatus and clean the pig.

BACKGROUND ART

Generally, in raw material supply apparatuses used in various industries and production facilities, accurately measured amounts of raw materials should be uniformly dispersed and accurately transferred and supplied with high purity without foreign matter.

In addition, for the sake of efficient use of the raw material supply apparatus, when a raw material in the same production line is changed or a transfer time is delayed, it is required to clean the transfer line in order to remove a solidified raw material and residue in the transfer line.

Currently, the transfer line of the raw material supply apparatus is cleaned using a pig, but the conventional pigging system has difficulty in cleaning according to a viscosity and characteristics of a raw material, an error occurs due to a manual process, and an accident in which an operator is exposed to slurry or the raw material in the pipe frequently occurs.

That is, according to the viscosity of the raw material, pigging using the pig should be repeated several times, and when the pig is stopped or restricted by a large friction force or viscosity in a specific section during a pigging operation, there is a problem that the operator is exposed to a risk when the operator checks a position and takes a follow-up measure.

Disclosure

Accordingly, the present invention is intended to address the above problems and directed to providing a pipe pigging system for cleaning a pig and controlling a speed of the pig, wherein the pipe pigging system is an automatic pipe pigging system in which the pig quickly and easily cleans the inside of a pipe while accurately checking a position of the pig and reciprocating the pig in the pipe and a speed of the pig is constantly maintained, accelerated, or decelerated according to a remaining amount, a viscosity, and characteristics of a raw material in order to clean the inside of the pipe, prevent slurry precipitation, prevent solidification due to a change in temperature of slurry, remove the remaining amount of slurry in the pipe, prevent mixing during replacing of a raw material, and prevent an accident during a system operation.

Technical Solution

One aspect of the present invention provides a pipe pigging system for cleaning a pig and controlling a speed of the pig, the pipe pigging system including a pig configured to clean an inside of a pipe for raw material supply while moving in the pipe, a first station connected to a raw material supply side that is one end of the pipe and configured to launch the pig and receive the returned pig, a second station connected to a raw material reception side that is the other end of the pipe and configured to receive the pig launched from the first station and launch the pig toward the first station, a first compressed air supply unit and a second compressed air supply unit configured supply compressed air to the first station and the second station, respectively, to move the pig, a first pig cleaning unit and a second pig cleaning unit connected to the first station and the second station, respectively, to clean the pig contaminated after cleaning the pipe, and a control unit configured to control a pigging operation of the pig launched and returned between the first station and the second station and a pigging speed of the pig.

Accordingly, cleaning may be automatically effectively performed by reciprocating the pig in the pipe.

The first station may include a first launch and reception trap connected to the one end of the pipe and configured to launch the pig and receive the returned pig, a pig detection unit configured to detect the pig in the first launch and reception trap, a pressure measurement unit configured to measure a pressure in the first launch and reception trap, a first blocking valve installed between the first launch and reception trap and the pipe, and a second blocking member installed between the first launch and reception trap and the first pig cleaning unit.

Accordingly, a pigging operation may be stably performed by moving the pig toward the second station while detecting the pig in the first station and measuring and monitoring a pressure.

The first pig cleaning unit may include a first cleaning chamber connected to the first launch and reception trap with the second blocking valve interposed therebetween, a first cleaning solution supply unit configured to supply a cleaning solution to the first cleaning chamber, a first cleaning solution supply line which connects the first cleaning solution supply unit and the first cleaning chamber and in which a valve is installed, and a first cleaning solution discharge line which is connected to the first cleaning chamber and in which a valve is provided to discharge the cleaning solution used for cleaning in the first cleaning chamber.

Accordingly, the contaminated pig used for pipe pigging while launched from the first station and returned to the second station may be easily and automatically cleaned and managed.

Each of the first and second compressed air supply units may include a compressed air supply line and a valve installed in a branch line branched off from the compressed air supply line, and the control unit may selectively control the valve to supply and block the compressed air.

Accordingly, the pig may be moved using the compressed air, and a moving speed of the pig may be adjusted by supplying and controlling an appropriate pressure.

The second station may include a second launch and reception trap connected to the other end of the pipe and configured to launch the pig and receive the pig moved from the first station, a pig detection unit configured to detect the pig in the second launch and reception trap, a pressure measurement unit configured to measure a pressure in the second launch and reception trap, a first blocking valve installed between the second launch and reception trap and the pipe, and a second blocking member installed between the second launch and reception trap and the first pig cleaning unit.

Accordingly, the pig may be launched from the second station toward the first station, and thus the cleaning efficiency of the pipe can be improved by reciprocating the pig.

The second pig cleaning unit may include a second cleaning chamber connected to the second launch and reception trap with the second blocking valve interposed therebetween, a second cleaning solution supply unit configured to supply a cleaning solution to the second cleaning chamber, a second cleaning solution supply line which connects the first cleaning supply unit and the first cleaning chamber and in which a valve is installed, and a second cleaning solution discharge line which is connected to the second cleaning chamber and in which a valve is provided to discharge the cleaning solution used for cleaning in the second cleaning chamber.

Accordingly, the pig returned to the second station in a state in which the pig is contaminated after cleaning the inside of the pipe may be automatically cleaned and managed.

A raw material supply tank may be connected to the first station through a raw material supply line and a raw material collection line, and a raw material storage tank may be connected to the second station through a raw material reception line.

Accordingly, raw material residue remaining in the pipe may be collected using the pig and used.

The pipe pigging system may further include a pig moving speed detection unit configured to calculate a moving speed by tracking a position of the pig which moves in the pipe.

The control unit may adjust an injection amount and an injection pressure of the compressed air by controlling driving of the first and second compressed air supply units so that a moving speed of the pig detected by the pig moving speed detection unit is maintained within a speed range preset for each pigging section.

Accordingly, the speed of the pig may be controlled according to raw material residue in the pipe, and then the pig may be moved.

The pig moving speed detection unit may include a plurality of pig detection sensors installed at predetermined intervals in a longitudinal direction of the pipe and configured to detect the pig and a pig speed calculation unit configured to receive information detected each of the plurality of pig detection sensors to calculate an actual moving speed of the pig, wherein the control unit may control the actual moving speed of the pig by adjusting a flow rate and a pressure of the compressed air by applying a correction value corresponding to the actual moving speed of the pig to satisfy an input speed value.

Accordingly, the pig speed can be easily controlled by detecting the moving speed of the pig according to a type of raw material in the pipe to adjust a supply amount of the compressed air.

The pig may include any one among an assembly type pig including at least one magnet, an integrated pig into which at least one magnet is inserted and which is formed of a flexible material, and a pig formed of a material containing magnetism.

Accordingly, a cleaning operation of the pipe can be easily performed while the pig reciprocates in the pipe, the position of the pig can be detected and tracked even when the pig is suddenly stopped during a pigging operation, and thus there is an advantage of facilitating maintenance.

Accordingly, when the pig is integrally manufactured with the magnet, the pig may be mass-produced at a low cost, and productivity can be improved.

Advantageous Effects

According to a pipe pigging system of the present invention, a cleaning operation can be automatically performed while reciprocating a pig between two sides of a pipe, and thus the pipe can be cleaned more thoroughly to increase reliability.

Accordingly, raw material residue in a pipe can be completely removed and prevented from being mixed with another raw material, and problems that the raw material residue suddenly scatters to the outside of the pipe and the like can be resolved.

In addition, since a pig contaminated when the pig performs pigging while moving in a pipe can be automatically cleaned anywhere at a starting point or a reception point, there are advantages facilitating a cleaning operation of the pig to facilitate maintenance and preventing re-contamination of the pipe.

In addition, since a magnet is provided in a pig and detected from the outside, a position of the pig can be tracked and observed during a pigging operation. Accordingly, a normal pigging operation can be managed, the position of the pig can be easily found even when the pig is suddenly stopped, and subsequent processing such as repair and withdrawal can be quickly and easily performed.

Modes of the Invention

Hereinafter, a pipe pigging system for cleaning a pig and controlling a speed of the pig according to embodiments of the present invention will be described in detail with reference to the accompanying drawings.

Figure 1:
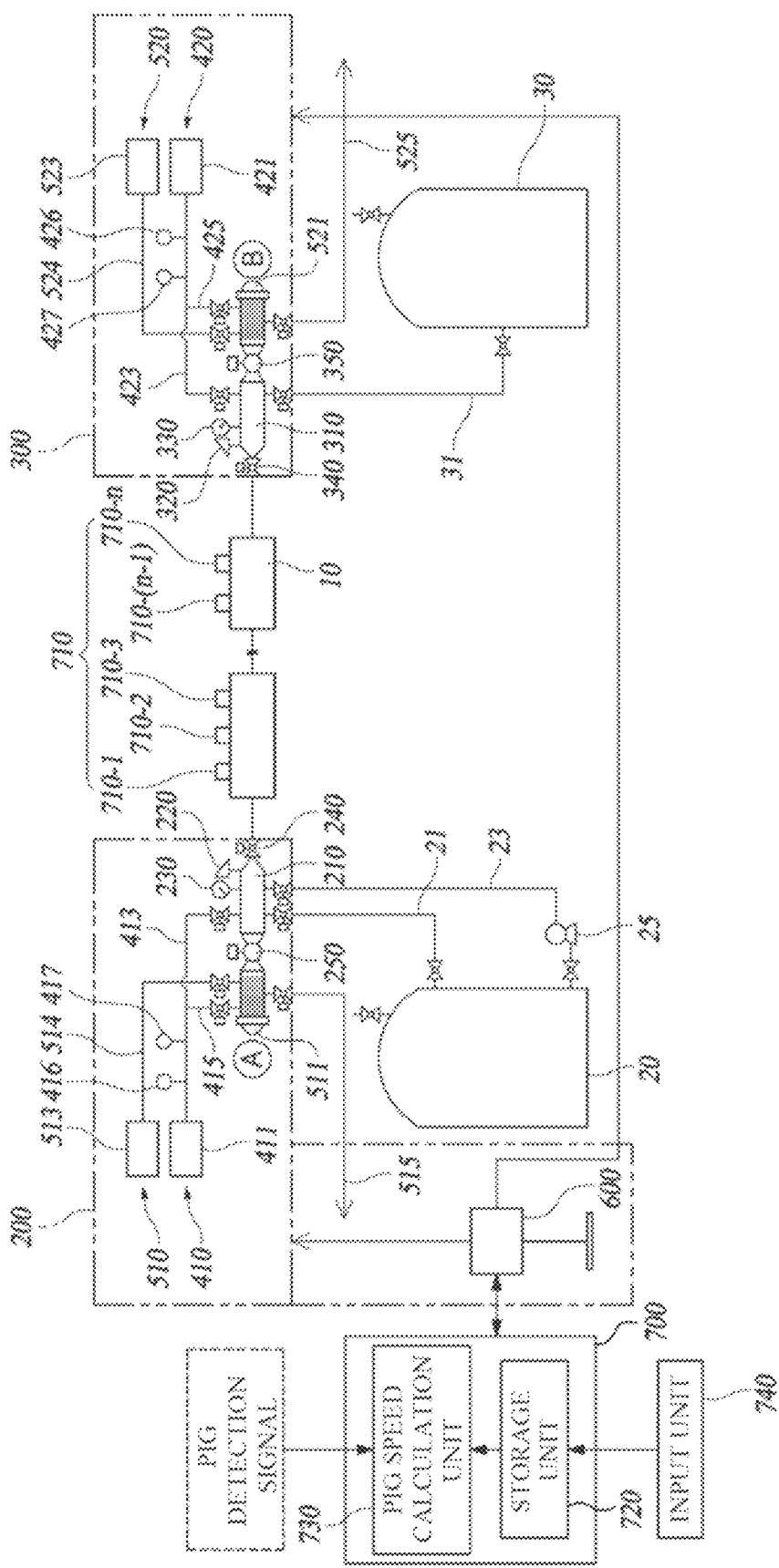
FIG. 1 is a schematic block diagram illustrating a pipe pigging system for cleaning a pig and controlling a speed of the pig according to an embodiment of the present invention.
Figure 2:
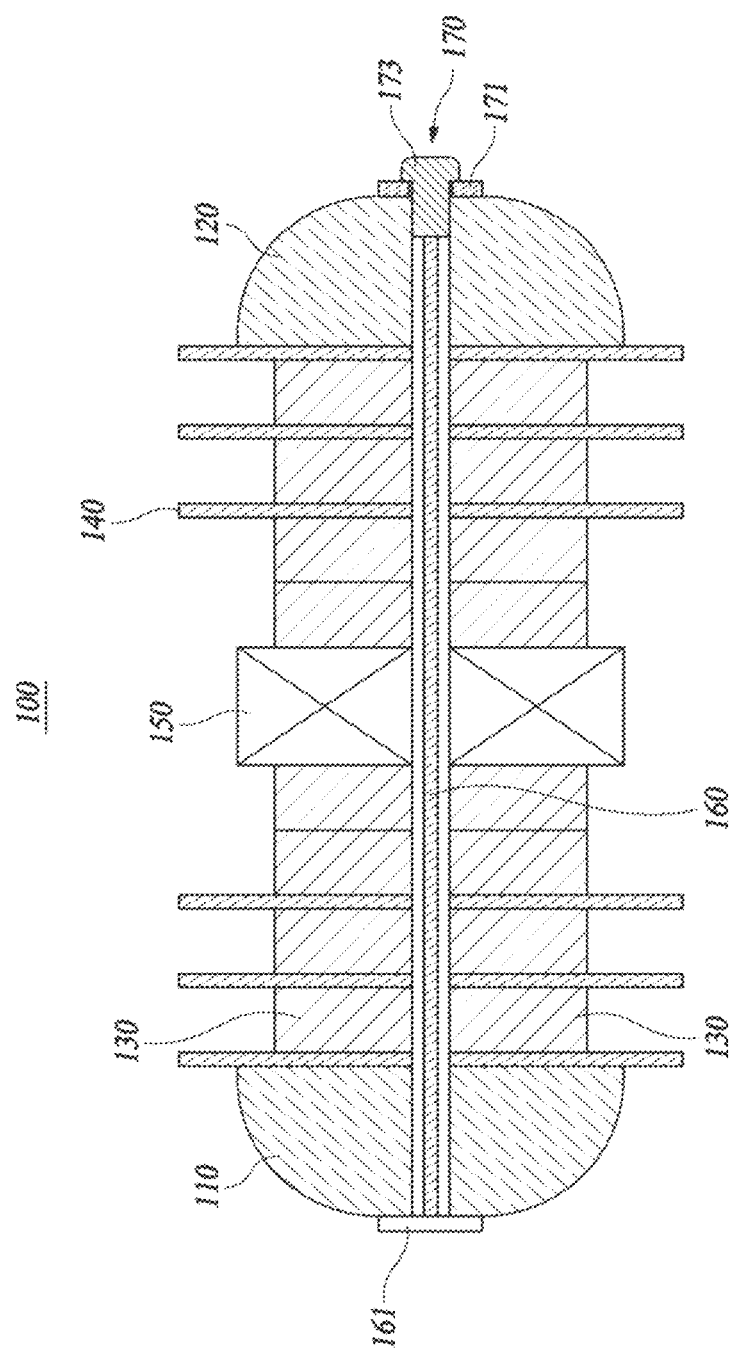
FIG. 2 is a schematic coupling cross-sectional view illustrating a pig applied to the pipe pigging system for cleaning a pig and controlling a speed of the pig according to the embodiment of the present invention.

Referring to FIGS. 1 and 2, a pipe pigging system for cleaning a pig and controlling a speed of the pig according to an embodiment of the present invention includes a pig 100 configured to move in a raw material supply line 10 (hereinafter, referred to as a "pipe") for raw material supply, a first station 200 connected to a raw material supply side that is one end of the pipe 10 and configured to launch and receive the pig 100, a second station 300 connected to a raw material reception side that is the other end of the pipe 10 and configured to launch and receive the pig 100, a first and second compressed air supply units 410 and 420 configured to supply compressed air to the first and second stations 200 and 300, respectively, a first and second pig cleaning units 510 and 520 connected to the first and second stations 200 and 300, respectively, and configured to wash the pig 100 after cleaning the pipe 10, a control unit 600 configured to control launching, returning, and cleaning operations of the pig 100 between the first and second stations 200 and 300, and a pig moving speed detection unit 700 configured to detect a moving speed of the pig 100 in the pipe 10.

A raw material supply tank 20 is connected to one end of the pipe 10, and a raw material storage tank 30 is connected to the other end of the pipe 10. Accordingly, a raw material of the raw material supply tank 20 may be supplied to the raw material storage tank 30 through the pipe 10.

The pig 100 is to remove the raw material remaining in the pipe 10. As illustrated in FIG. 2, the pig 100 is a so-called assembly type pig including a front head 110, a rear head 120, a plurality of spacers 130, a plurality of scrapers 140, a magnet 150, a coupling shaft member 160, and a fastening member 170.

The front head 110 and the rear head 120 are positioned at the front and rear of the pig, one thereof serves as a front end in a travel direction in the pipe 10, and the other serves to receive a pressure of compressed air from behind. The front head 110 and the rear head 120 may have various shapes but may be formed in hemispherical shapes in view of resistance and the like and are preferably smaller than an inner diameter of the pipe 10. The front head 110 and the rear head 120 are preferably formed of elastic materials such as silicone, urethane, viton, synthetic resin, and rubber. In a center of each of the front head 110 and the rear head 120, a hollow through which the coupling shaft member 160 passes is formed.

The spacers 130 are provided so that the scrapers 140 and the magnet 150 are installed to be spaced apart from each other, and the plurality of spacers 130 are disposed to be spaced apart from each other between the front head 110 and the rear head 120. Each of the spacers 130 may also be formed of an elastic material, that is, may be formed of the same material as the front head 110 and the rear head 120. In addition, the spacer 130 is formed to have a size smaller than the front head 110 and the rear head 120, and a hollow through which the coupling shaft member 160 passes is formed at a center of the spacer 130.

Each of the scrapers 140 is installed between the spacers 130, and a brush may be installed on an outer circumference of the scraper 140. The scraper 140 has a disc shape having a hollow at a center of the scraper 140. When the scraper 140 passes through the pipe 10, the scraper 140 removes internal scale and sweeps a place, through which the front head 110 or the rear head 120 pass, again to completely remove residue in the pipe 10. The scraper 140 may also be formed of an elastic material, synthetic resin, or steel, and the present invention is not limited to the material.

The magnet 150 is disposed at a center between the front head 110 and the rear head 120, has a ring or cylindrical shape, and has a hollow, through which the coupling shaft member 160 passes, at a center of the magnet 150. The magnet 150 is provided so that a position of the pig 100 is detected from the outside during a pipe pigging operation.

The coupling shaft member 160 is installed to pass through the hollow each of the spacer 130, the scraper 140, and the magnet 150 which are disposed to be stacked between the front head 110 and the rear head 120 as described above, an extension head 161 is formed on one end of the coupling shaft member 160 and supported by an outer side of the front head 110, and the other end protrudes outward from the rear head 120 and is coupled to the fastening member 170. The coupling shaft member 160 may include a metal wire.

The fastening member 170 may include a blocking member 171 coupled to the other end of the coupling shaft member 160, disposed outside the rear head 120, and having a disc structure and a nut 173 allowing the blocking member 171 to be pressed against the rear head 120 so that the components of the pig 100 described above are in close contact with and coupled to each other between the front head 110 and the rear head 120. The nut 173 may be fixedly bolting-coupled to an end of the coupling shaft member 160 with the blocking member 171.

Figure 3:
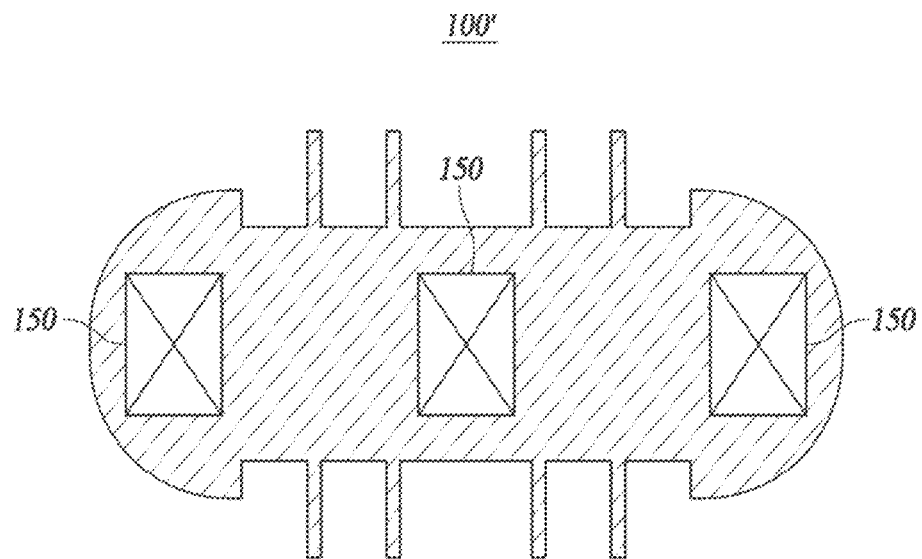
FIG. 3 is a view illustrating another example of the pig illustrated in FIG. 2.

The pig 100 having such a configuration has an assembly type structure manufactured by assembling a plurality of components. Alternatively, as illustrated in FIG. 3, a pig 100' may be manufactured in a molding manner so that other components are integrally formed, wherein a magnet 150 is embedded in the pig 100. That is, in the pig 100', a front head 110, a rear head 120, a spacer 130, and a scraper 140 may be integrally formed, and a material thereof may be the same as the above-described material of the front head 110 of the pig 100.

The first station 200 is installed at one end portion of the pipe 10, that is, the raw material supply side, and includes a first launch and reception trap 210, a pig detection unit 220 configured to detect whether the pig 100 is in the first launch and reception trap 210, and a pressure measurement unit 230 configured to detect a pressure in the first launch and reception trap 210.

The first launch and reception trap 210 is connected to one end portion of the pipe 10, and a first blocking valve 240 is installed between the first launch and reception trap 210 and the pipe 10. In a state in which the pig 100 is accommodated in the first launch and reception trap 210, the pig 100 may be launched and moved toward the second station 300 by compressed air supplied from the first compressed air supply unit 510. A first cleaning chamber 511, which will be described below, may be connected to a front end of the first launch and reception trap 210, and the pig 100 may be inserted into the first launch and reception trap 210 through the first cleaning chamber 511. The first launch and reception trap 210 is connected to the raw material supply tank 20 through a raw material collection line 21 and a raw material supply line 23. A valve is installed in each of the raw material collection line 21 and the raw material supply line 23, and a raw material supply pump 25 is installed in the raw material supply line 23.

A second blocking valve 250 is installed between the first launch and reception trap 210 and the first cleaning chamber 511.

The pig detection unit 220 is installed outside the first launch and reception trap 210 to detect whether the pig 100 is in the first launch and reception trap 210. The pig detection unit 220 may include a magnetism detection sensor to detect a magnet, that is, the magnet 140 of the pig 100. Information detected by the pig detection unit 220 is transmitted to the control unit 600 through wired or wireless communication.

In addition, the pressure measurement unit 230 is installed in the first launch and reception trap 210, measures a pressure therein, and transmits a measured value to the control unit 600.

The second station unit 300 is installed at the other end of the pipe 10, that is, the raw material reception side, and includes a second launch and reception trap 310, a pig detection unit 320 configured to detect whether the pig 100 is in the second launch and reception trap 310, and a pressure measurement unit 330 configured to detect a pressure in the second launch and reception trap 310.

The second launch and reception trap 310 is connected to the other end of the pipe 10, and a first blocking valve 340 is installed between the second launch and reception trap 310 and the pipe 10. In a state in which the pig 100 is accommodated in the second launch and reception trap 310, the pig 100 may be launched and moved toward the first station 200 by compressed air supplied from a second compressed air supply unit 520. A second cleaning chamber 521, which will be described below, is connected to a rear end of the second launch and reception trap 310, the pig 100 may be inserted into the second launch and reception trap 210 through the second cleaning chamber 521. A second blocking valve 350 is installed between the second launch and reception trap 310 and the second cleaning chamber 521. The second launch and reception trap 310 is connected to the raw material storage tank 30 through a raw material receiving line 31. A valve is installed in the raw material receiving line 31.

The pig detection unit 320 is installed outside the second launch and reception trap 310 to detect whether the pig 100 is in the second launch and reception trap 310. The pig detection unit 320 may include a magnetism detection sensor capable of detecting the magnet 140 of the pig 100. Information detected by the pig detection unit 320 is transmitted to the control unit 600 through wired or wireless communication.

In addition, the pressure measurement unit 330 is installed in the second launch and reception trap 310, measures a pressure therein, and transmits a measured value to the control unit 600.

The first compressed air supply unit 410 includes a first compressed air generation unit 411, a first compressed air supply line 413 configured to supply compressed air generated by the first compressed air generation unit 411 to the first launch and reception trap 210, and a branch line 415 branched off from the first compressed air supply line 413 to supply the compressed air to the first cleaning chamber 511. A valve is installed in each of the first compressed air supply line 413 and the branch line 415 to selectively control supply and blocking of the compressed air so that the compressed air generated by the first compressed air generation unit 411 may be selectively supplied to the first cleaning chamber 511 or the first launch and reception trap 210.

In addition, the first compressed air supply line 413 includes a flow rate sensor 416 configured to detect a supply flow rate of compressed air and a pressure sensor 417 configured to detect a supply pressure of the compressed air. Information detected by the flow rate sensor 416 and the pressure sensor 417 is transmitted to the control unit 600.

The second compressed air supply unit 420 includes a second compressed air generation unit 421, a second compressed air supply line 423 configured to supply compressed air generated by the second compressed air generation unit 421 to the second launch and reception trap 310, and a branch line 425 branched off from the second compressed air supply line 423 to supply the compressed air to the second cleaning chamber 521. A valve is installed in each of the second compressed air supply line 423 and the branch line 425 to selectively control supply and blocking of the compressed air so that the compressed air generated by the second compressed air generation unit 421 may be selectively supplied to the second cleaning chamber 521 or the second launch and reception trap 210.

In addition, the second compressed air supply line 423 includes a flow rate sensor 426 configured to detect a supply flow rate of compressed air and a pressure sensor 427 configured to detect a supply pressure of the compressed air. Information detected by the flow rate sensor 426 and the pressure sensor 427 is transmitted to the control unit 600.

The first pig cleaning unit 510 is to clean the pig 100, which returns to the first station 200 after cleaning the inside of the pipe 10 while moving in the pipe 10, using a cleaning solution. The first pig cleaning unit 510 includes the first cleaning chamber 511 connected to the first launch and reception trap 210, a first cleaning solution supply unit 513 configured to supply the cleaning solution to the first cleaning chamber 511, a first cleaning solution supply line 514 which connects the first cleaning solution supply unit 513 and the first cleaning chamber 511 and in which a valve is installed, and a first cleaning solution discharge line 515 which is connected to the first cleaning chamber 511 and in which a valve is provided to discharge a cleaning solution used for cleaning in the first cleaning chamber 511.

The first cleaning chamber 511 is connected to the first launch and reception trap 210 with the second blocking valve 250 interposed therebetween. A front end of the first cleaning chamber 511 may be opened, and the pig 100 may be input thereto for an initial pipe pigging operation. In a state in which the second blocking valve 250 is opened, compressed air may be supplied through the sub-supply line 415 to move the pig 100 input to the first cleaning chamber 511 to the first launch and reception trap 210. The pig 100 launched from the first launch and reception trap 210 and moved to the second station 300 may be launched again from the second launch and reception trap 310 and returned to the first launch and reception trap 210, and the second blocking valve 250 may be opened so that the pig 100 may return to the first cleaning chamber 511.

As described above, the pig 100 returned after used for cleaning may be cleaned by the cleaning solution in the first cleaning chamber 511. That is, the first cleaning solution supply unit 513 pumps the cleaning solution from a cleaning solution storage tank or cleaning solution source that is not illustrated and supplies the cleaning solution to the first cleaning chamber 511 through the first cleaning solution supply line 514. In this case, when the cleaning solution is supplied to the first cleaning chamber 511 at a high pressure, a cleaning effect of the pig 100 may be further improved. Then, the cleaning solution used for cleaning may be discharged through the first cleaning solution discharge line 515 and treated.

In addition, the second pig cleaning unit 520 is to clean the pig 100, which returns to the second station 300 after cleaning the inside of the pipe 10 while moving in the pipe 10, using the cleaning solution. The second pig cleaning unit 520 has the same configuration as the first pig cleaning unit 510. That is, the second pig cleaning unit 520 includes the second cleaning chamber 521 connected to the second launch and reception trap 310, a second cleaning solution supply unit 523 configured to supply the cleaning solution to the second cleaning chamber 521, and a second cleaning solution supply line 524 which connects the second cleaning solution supply unit 523 and the second cleaning chamber 521 and in which a valve is installed, and a second cleaning solution discharge line 525 which is connected to the second cleaning chamber 521 and in which a valve is provided to discharge the cleaning solution used for cleaning in the second cleaning chamber 521. The second pig cleaning unit 520 having such a configuration is to clean the pig 100, which moves to the second station 300 in a contaminated state after moving and cleaning in the pipe 10, using the cleaning solution, and since a specific configuration and a cleaning process thereof are the same as those of the first pig cleaning unit 510, details thereof will be omitted.

The pig moving speed detection unit 700 calculates a moving speed by tracking a position of the pig 100 moving in the pipe 10 and transmits calculated information to the control unit 600. The pig moving speed detection unit 700 includes pig detection sensors 700 installed at predetermined intervals in a longitudinal direction of the pig 100 to detect the pig 100, a storage unit 720 in which a correction value corresponding to a type of raw material in the pipe 10 is stored as a lookup table, and a pig speed calculation unit 730 that receives information detected from each of the plurality of pig detection sensors 710, calculates a moving speed of the pig 100, and applies the correction value stored in the storage unit 720 to calculate an actual moving speed of the pig 100.

The pig detection sensors 710 are installed at predetermined intervals in the longitudinal direction of the pipe 10 between the first and second stations 200 and 300 to detect the pig 100. The pig detection sensors 710 may include a plurality of magnetic sensors (710-1, 710-2, 710-3 to 710-(n−1), and 710-n) configured to detect magnetism of the pig 100. Accordingly, the pig 100 moving in the pipe 10 during a pigging operation is detected by the plurality of magnetic sensors (710-1, 710-2, 710-3 to 710-(n−1), and 710-n), and detected information is transmitted to the pig speed calculation unit 730.

In the storage unit 720, a type of raw material to be transferred through the pipe 10 and a correction factor considering a viscosity (friction coefficient or the like) for each raw material may be stored in the form of a lookup table. Data stored in the storage unit 720 is input through a separate input unit 740, and the input unit 740 may include a terminal and a computer, and may include a separate touch type input device.

The pig speed calculation unit 730 calculates the actual moving speed of the pig 100 in the pipe 10 on the basis of the information detected by the plurality of magnetic sensors (710-1, 710-2, 710-3 to 710-(n−1), and 710-n) and the information stored in the storage unit 720.

First, the pig speed calculation unit 730 may calculate a theoretical pigging speed (input value) of the pig using Equation 1 below.

$$v = \frac{Q}{\pi \frac{D^2}{4} \times 60 \times 10^{-3}} \times \frac{1.01325}{P + 1.01325} \quad [\text{Equation 1}]$$

Here, D denotes an inner diameter (mm) of a pipe, Q denotes a flow rate (L/min) of air, and P denotes a pressure (.G) of compressed air, v denotes a linear speed (m/sec) of compressed air in the pipe.

The pig speed calculation unit 730 may calculate an actual speed (pigging speed), at which the pig may actually move, by applying the correction factor according to the type of raw material using Equation 2 below. The calculated actual speed (pigging speed) of the pig is transmitted to the control unit 600.

$$v_{act} = \alpha \times v \quad [\text{Equation 2}]$$

Here, $V_{act}$ denotes an actual speed of a pig, and a denotes the correction factor.

Accordingly, the control unit 600 may adjust and control an injection amount and an injection pressure of compressed air based on the correction value (correction factor) by controlling driving of the first and second compressed air supply units 410 and 420 so that a moving speed of the pig detected by the pig moving speed detection unit 700 maintains a preset speed range.

As described above, a speed according to a position of the moving pig is detected, an actual pig speed is calculated by applying a correction value for each position so that a detected pig speed corresponds to an input speed value, and a supply flow rate and a supply pressure of compressed air are controlled by the control unit 600 to correspond to the calculated actual pig speed.

In addition, the control unit 600 controls a pigging operation of the pipe 10 using the pig 100 and a cleaning operation of the pig 100 contaminated after being used for pigging.

Hereinafter, an operational effect of the pipe pigging system for cleaning a pig and controlling a speed of the pig according to the embodiment of the present invention having the above configuration will be described in detail.

As an example, when the pig 100 is input toward the first station 200 and moved toward the second station 300 and cleans the inside of the pipe 10, the control unit 600 changes the valve of each of the raw material collection line 21 and the raw material supply line 23, which are disposed between and connected the raw material supply tank 20 and the first launch and reception trap 210, to a closed state.

In this state, the front end of the first cleaning chamber 511 is opened, the pig 100 is inserted into the first cleaning chamber 511, and the first cleaning chamber 511 is closed. Then, compressed air is supplied into the cleaning chamber 511 through the branch line 415 of the first compressed air supply unit 410 to move the pig 100 in the first cleaning chamber 511 to the first launch and reception trap 210.

When the pig moves to the first launch and reception trap 210, the pig detection unit 220 detects the pig, and detected information is transmitted to the control unit 600. After the control unit 600 checks that the pig 100 is positioned in the first launch and reception trap 210, the control unit 600 opens the first blocking valve 340 of the second station 300 and blocks the second blocking valve 350. Then, the control unit 600 opens the valve of the raw material receiving line 31.

Then, in a state in which the blocking valve 240 of the first station 200 is opened, the control unit 600 drives and controls the first compressed air supply unit 410 to generate compressed air and supply the compressed air into the first launch and reception trap 210. Then, the pig 100 enters the pipe 10 due to a pressure of the compressed air, moves toward the second station 300 to move raw material residue remaining in the pipe 10 to the second launch and reception trap 310 of the second station 300 and thus can remove the raw material residue in the pipe 10.

As described above, the raw material residue removed while the pig 100 moves from the first station 200 to the second station 300 is moved to the second launch and reception trap 310, moved to the raw material storage tank 30 through the receiving line 31, and treated. The control unit 600 controls the first compressed air supply unit 410 to maintain an appropriate pressure according to a pressure detected by the pressure measurement unit 230 while moving the pig 100 to press the pig 100 so that the pig 100 moves at a preset speed.

In addition, when the pig 100 is moved into the second launch and reception trap 310 due to the compressed air, the pig detection unit 320 of the second station 300 detects the pig 100, and detected information is transmitted to the control unit 600.

Then, the control unit 600 stops driving of the first compressed air supply unit 410, drives the second compressed air supply unit 420 to move the pig 100 toward the first station 200 to push and remove raw material residue remaining in the pipe 10 in the opposite direction. In this case, the control unit 600 closes the valve of the raw material receiving line 31 connected to the raw material storage tank 30, monitors a pressure measurement value of the pressure measurement unit 330 of the second station 300, and controls the pig 100 to be moved toward the first station 200 using a constant pressure. While the pig 100 returns and moves toward the first station 200, raw material residue remaining in the pipe 10 may be raked again and moved to the first launch and reception trap 210 and then completely removed. The raw material residue moved to the first launch and reception trap 210 may be collected in the raw material supply tank 20 by opening the valve of the collection line 210.

When the pig 100 returns to the first launch and reception trap 210, the pig detection unit 220 detects the pig 100 and transmits the detection to the control unit 600. Then, the control unit 600 controls a process of cleaning the pig 100 contaminated in a cleaning process of the pipe 10 to be performed. That is, the control unit 600 opens the second blocking valve 250 and drives and controls the first or second compressed air generation units 410 and 420 to supply compressed air to the first launch and reception trap 210. Then, the pig 100 in the first launch and reception trap 210 is pushed and moved into the first cleaning chamber 511 due to a pressure. The control unit 600 may determine that the pig 100 has moved to the first cleaning chamber 511 when a detection signal of the pig 100 is not detected by the pig detection unit 220 of the first station 200. Then, the control unit 600 blocks the second blocking valve 250 and controls a cleaning operation of the pig 100 to be performed using the first pig cleaning unit 510. That is, when the cleaning solution supply unit 513 supplies a cleaning solution to the first cleaning chamber 511 through the cleaning solution supply line 514, a contaminated portion of the pig 100 in the first cleaning chamber 511 may be thoroughly cleaned by the cleaning solution supplied at a high pressure. In this case, when the cleaning solution is supplied until the cleaning solution fills the first cleaning chamber 511 above a predetermined level, and when, in a state in which the cleaning solution fills above the predetermined level, the cleaning solution is controlled to be drained through the cleaning solution drainage line 515 while supplied at a high pressure, a vortex is generated due to the cleaning solution supply pressure in the first cleaning chamber 511, and thus the pig 100 can be cleaned more effectively and quickly.

When the cleaning process is completed, the control unit 60 stops the supply of the cleaning solution and drives the first compressed air supply unit 510 again to supply compressed air to the first cleaning chamber 511 through the sub line 415 to discharge the cleaning solution to the cleaning solution drain line 515, cleaning solution reside remaining on the pig 100 can also be effectively shaken off and dried using the compressed air at the high pressure.

The pig 100 which is cleaned as described above may be withdrawn from the first cleaning chamber 511 or stored therein without being withdrawn.

Meanwhile, although it has been described above that the pig 100 is moved from the first station 200 to the second station 300 and reciprocated to return from the second station 300 to the first station 200 to clean the inside of the pipe 10, this is only an exemplary. That is, conversely, the pig 100 may be started from the second station 300 to reach the first station 200 and then returned to the second station 300. Then, after returned, the contaminated pig 100 may be moved into the second cleaning chamber 521 and cleaned by the second pig cleaning unit 520.

In addition, when the pig 100 stops due to a large friction force or sludge in a certain section of the pipe 10 during the pigging operation as described above, a position of the pig 100 may be detected and checked by the pig detection sensor 710.

In addition, more preferably, the pig moving speed detection unit 700 calculates an actual moving speed of the pig 100 in the pipe 10 on the basis of information detected by the magnetic sensors (710-1, 710-2, 710-3 to 710-(n-1), and 710-n) installed at predetermined intervals on the outside of the pipe 10 and the information (correction factor) stored in the storage unit 720 and provides the actual moving speed to the control unit 600 during the pigging operation. Then, the control unit 600 may control a supply pressure and a flow rate of compressed air in a predetermined range so that the pig 100 moves according to the calculated actual moving speed and thus can improve the pipe cleaning efficiency.

That is, a pigging speed may be controlled to be within a predetermined range or an input speed value from pigging start to pigging end to improve the pipe cleaning effect, and whether a pigging speed is constantly maintained or is high at an initial stage and is decreased toward an end point, or the pigging operation is performed at a low speed at the initial stage and a speed is gradually increased toward the end point may be controlled to properly correspond to growth of residue in the pipe according to a use environment.

As an example, when pigging starts, since there is much residue in the pipe at a rear end portion in the longitudinal direction of the pipe 10 and a large force is required, the pig 100 may be slowly moved using a large force by increasing a supply pressure and a supply amount of compressed air. Then, after the pig 100 moves a certain distance, a resistance due to the residue in the pipe 10 decreases toward an end point, and thus the pig 100 may be controlled to move even using low pressure and flow rate. In this case, since a speed of the pig 100 may be increased, a pigging time may also be decreased. As described above, since there is a difference in pressure and flow rate of compressed air required for pigging between the initially stage and the end point, the pig 100 may also be controlled to be moved at different speeds at each position by detecting moving positions of the pig 100 using the magnetic sensors (710-1, 710-2, 710-3 to 710-(n-1), and 710-n), applying correction values according to position values, and comparing actual speeds and proper speeds at each position.

As described above, according to the pipe pigging system for cleaning a pig and controlling a speed of the pig according to the embodiment of the present invention, since the pipe 10 may clean the pipe 10 while reciprocating the pig 100 bidirectionally, a degree of the cleanness of the pipe 10 can be improved.

In addition, when the pipe 10 is pigged using the pigging system of the present invention, sludge in the pipe 10 can be prevented from precipitating according to long-term storage.

In addition, since the magnet 140 is installed in the pig 100 to detect the pig 100 during a pigging operation and track a position of the pig 100, there are advantages that a normal operation of the system can be performed, and a maintenance operation is easy during emergency stop.

In addition, according to the present invention, since a flow rate and a pressure of compressed air are controlled to adjust a moving speed of the pig 100, an appropriate pigging speed required for effective cleaning of the pipe 10 can be controlled.

Modes of the Invention

Figure 4:
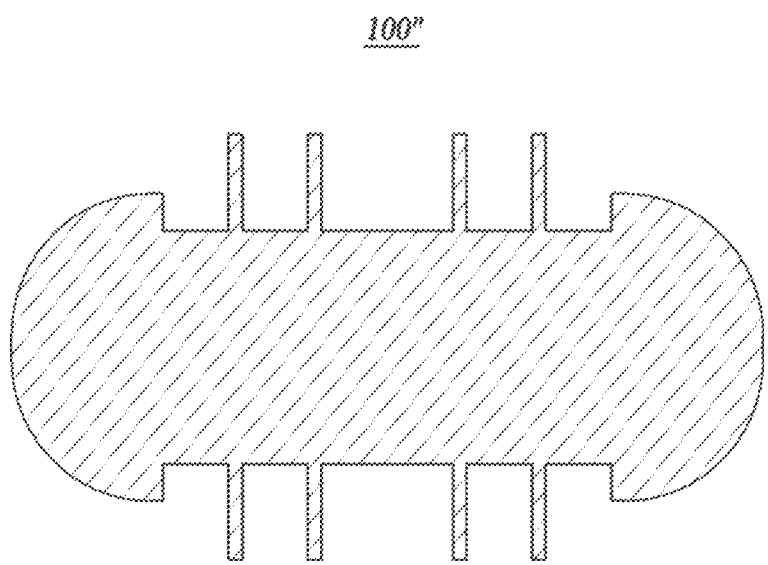
FIG. 4 is a view illustrating still another example of the pig illustrated in FIG. 2.

In addition, a pig 100" according to another embodiment of the present invention is illustrated in FIG. 4. In the integrated pig 100" illustrated in FIG. 4, the front head 110, the rear head 120, the spacer 130, and the scraper 140 described with reference to FIG. 2 are integrally formed, and a material thereof may be the same as that of the front head 110 of the pig 100 described above. However, the pig 100"

is preferably formed of a material including a magnetic component and preferably formed of a rubber material including a magnetic component. As described above, when the pig 100" is manufactured of the rubber material including the magnetic material, the pig 100" can be easily detected by a pig detection unit during a pigging operation without installing a separate magnet, and thus real-time tracking and observation of the pig 100" can be facilitated.

Although the present invention has been illustrated and described with reference to exemplary embodiments for illustrating the principle of the present invention above, the present invention is not limited to the illustrated and described configuration and operation. Further, those skilled in the art may easily understand that many changes and modifications of the present invention are possible without departing from the spirit and scope of the appended claims.

The invention claimed is:

1. A pipe pigging system for cleaning a pig and controlling a speed of the pig, the pipe pigging system comprising:
   a pig configured to clean an inside of a pipe for raw material supply while moving in the pipe;
   a first station connected to a raw material supply side that is one end of the pipe and configured to launch the pig and receive the returned pig;
   a second station connected to a raw material reception side that is the other end of the pipe and configured to receive the pig launched from the first station and launch the pig toward the first station;
   a first compressed air supply unit and a second compressed air supply unit configured to supply compressed air to the first station and the second station, respectively, to move the pig;
   a first pig cleaning unit and a second pig cleaning unit connected to the first station and the second station, respectively, to clean the pig contaminated after cleaning the pipe; and
   a control unit configured to control a pigging operation of the pig launched and returned between the first station and the second station and a pigging speed of the pig,
   wherein a raw material supply tank is connected to the first station through a raw material supply line and a raw material collection line; and a raw material storage tank is connected to the second station through a raw material reception line,
   wherein the first station includes
       a first launch and reception trap connected to the one end of the pipe and configured to launch the pig and receive the returned pig,
       a pig detection unit configured to detect the pig in the first launch and reception trap,
       a first blocking valve installed between the first launch and reception trap and the pipe, and
       a second blocking valve installed between the first launch and reception trap and the first pig cleaning unit,
   wherein the second station includes
       a second launch and reception trap connected to the other end of the pipe and configured to launch the pig and receive the pig moved from the first station,
       a pig detection unit configured to detect the pig in the second launch and reception trap,
       a first blocking valve installed between the second launch and reception trap and the pipe, and
       a second blocking valve installed between the second launch and reception trap and the second pig cleaning unit, and
   wherein when the control unit has confirmed that the pig is located in the first launch and reception trap, the control unit opens the first blocking valve at the second station, closes the second blocking valve at the second station, and opens a valve on the raw material reception line.

2. The pipe pigging system of claim 1, wherein the first station includes:
   a pressure measurement unit configured to measure a pressure in the first launch and reception trap.

3. The pipe pigging system of claim 1, wherein the first pig cleaning unit includes:
   a first cleaning chamber connected to the first launch and reception trap with the second blocking valve of the first station interposed therebetween;
   a first cleaning solution supply unit configured to supply a cleaning solution to the first cleaning chamber;
   a first cleaning solution supply line which connects the first cleaning solution supply unit and the first cleaning chamber and in which a valve is installed; and
   a first cleaning solution discharge line which is connected to the first cleaning chamber and in which a valve is provided to discharge the cleaning solution used for cleaning in the first cleaning chamber.

4. The pipe pigging system of claim 1, wherein:
   each of the first and second compressed air supply units includes a compressed air supply line and a valve installed in a branch line branched off from the compressed air supply line; and
   the control unit selectively controls each of the valves of the compressed air supply units to supply and block the compressed air.

5. The pipe pigging system of claim 1, wherein the second station includes:
   a pressure measurement unit configured to measure a pressure in the second launch and reception trap.

6. The pipe pigging system of claim 1, wherein the second pig cleaning unit includes:
   a second cleaning chamber connected to the second launch and reception trap with the second blocking valve of the second station interposed therebetween;
   a second cleaning solution supply unit configured to supply a cleaning solution to the second cleaning chamber;
   a second cleaning solution supply line which connects the second cleaning supply unit and the second cleaning chamber and in which a valve is installed; and
   a second cleaning solution discharge line which is connected to the second cleaning chamber and in which a valve is provided to discharge the cleaning solution used for cleaning in the second cleaning chamber.

7. The pipe pigging system of claim 1, further comprising a pig moving speed detection unit configured to calculate a moving speed by tracking a position of the pig which moves in the pipe,
   wherein the control unit adjusts an injection amount and an injection pressure of the compressed air by controlling driving of the first and second compressed air supply units so that a moving speed of the pig detected by the pig moving speed detection unit is maintained within a speed range preset for each pigging section.

\* \* \* \* \*